May 10, 1966  J. W. McGRATH  3,250,988
TESTING APPARATUS FOR DETERMINING THE OPERATE
AND RELEASE CURRENTS OF RELAYS
Filed Dec. 6, 1960

INVENTOR
J. W. McGRATH
By A. J. Nugent
ATTORNEY

United States Patent Office 3,250,988
Patented May 10, 1966

3,250,988
TESTING APPARATUS FOR DETERMINING THE OPERATE AND RELEASE CURRENTS OF RELAYS
John W. McGrath, Allentown, Pa., assignor to Western Electric Company, Incorporated, a corporation of New York
Filed Dec. 6, 1960, Ser. No. 74,060
1 Claim. (Cl. 324—28)

This invention relates to relay testing and more particularly to a relay testing circuit which indicates the difference between the operate and release currents of a relay.

In the testing of relay switches, it is important to ascertain the "just operate" current and the difference between that current and the "just release" current so that the relay switches meet the operating requirements of the circuits in which they are eventually to be used. It has been the prior practice to obtain the operate and release current readings by separate testing operations and to then subtract the release current reading from the operating current reading to obtain the difference.

It is an object of the present invention to provide a relay switch testing circuit which automatically indicates the difference between the operating and release currents.

It is a further object of the present invention to provide in a relay switch testing circuit, an indication of the operacting current, together with an indication of the difference between the operating and release currents.

Other objects and advantages of the invention will become apparent from the remaining desciption.

In carrying out the invention, there is provided a switch testing apparatus comprising a first circuit adapted to produce an operate current flow through a coil which operates a switch, and a second circuit connectible across the coil and adapted to produce a current flow which reduces the operate current flow. In making a test, the first circuit is enabled and when the current therein reaches the operating value, the switch under test is actuated and the "just operate" current is stored. Actuation of the switch conditions the second circuit for current flow, and the latter current acts to diminish the operate current until the current flow through the coil is such that the switch is released. A meter in the second circuit indicates the amount of current flowing therein when the switch is released. This reading, therefore, represents the difference between the operate and release currents of the switch under test.

In one embodiment, the invention utilizes a vacuum tube circuit for measuring the difference between operate and release currents for switches actuated by a coil connectible in the plate circuits of two tubes connected in inverse relationship. A meter in the plate circuit of the first tube is utilized for measuring the just operate current and a delta meter in the plate circuit of the second tube measures the difference between the operate current and the release current of the coil under test. A delta meter may be considered to be a meter which measures a current increment which in the present case would be a current representative of the difference between the relay operate and release currents. Each of the tube input circuits is provided with a resistor-capacitor network for bringing the plate current up to the proper value and holding it for reference.

While the invention is described in connection with a relay coil into which switches, such as mercury switches, to be tested are inserted, it is to be understood that, according to the present invention, various other switches may be tested or a separate complete relay including a switch or switches may be tested during each testing operation. Suitable plug-in arrangements may be included whether the switches are individually tested or whether complete relays are tested.

The invention will now be described in greater detail by reference to the drawing, wherein.

Figure 1:
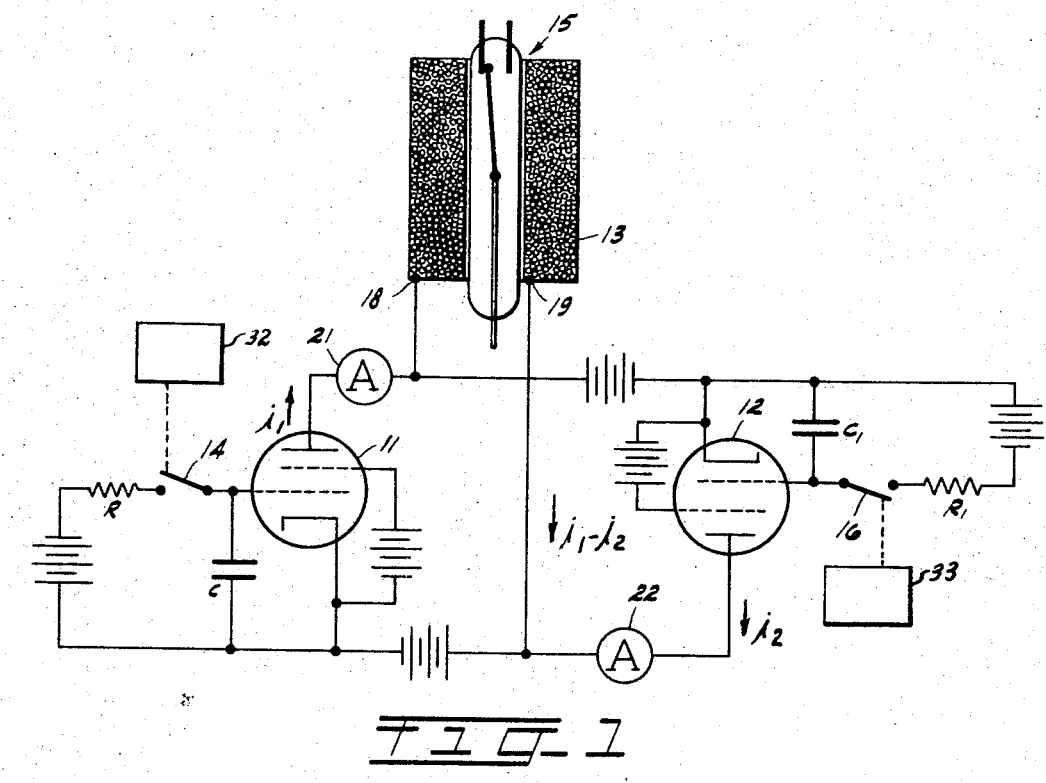
FIG. 1 is a schematic circuit illustration of the invention.

In the drawing, two tubes 11 and 12 are shown connected in inverse relationship to provide currents $i_1$ and $i_2$. The input of tube 11 includes a resistor-capacitor network provided by the components R and C while similarly, the input of tube 12 includes a resistor-capacitor network provided by the component $R_1$ and $C_1$. Further, the input of tube 11 includes a switch 14 which is closed at the start of a testing operation, and the input of tube 12 includes a switch 16 which is normally open at the start of a testing operation.

In practicing the invention, a switch to be tested, such as a mercury switch 15, is inserted into the coil 13 shown between terminals 18 and 19 and maintained therein in any convenient manner. Switch 14 is then operated to its closed position, causing current to flow in the plate circuit of tube 11 as the voltage applied to the capacitor C builds up, that is, the voltage becomes less negative. When the current through the coil 13 rises to the operate point, the switch 15 under test is actuated and, through an appropriate relay circuit shown in FIG. 2, switch 14 is opened, leaving the capacitor C with a fixed input biasing voltage. On opening of switch 14, switch 16 is closed to enable conduction in tube 12, the input biasing voltage for which is built up in accordance with the current characteristics of the $R_1$–$C_1$ network. As the current of plate circuit in the tube 12 increases, the current through the coil 13 diminishes, a point being reached at which the relay defined by coil 13 and switch 15 is released and thereby opens the cwitch 16. At the release time a steady grid bias voltage is applied to tube 12 from the capacitor $C_1$ similar to the steady grid bias applied to the tube 11 by the capacitor C. Delta meter 22 now gives an indication of the amount of which has been substracted from the operate current and which was required to release the relay. The charge on capacitor C and $C_1$ may be reduced to cutoff in any convenient manner, if necessary. Thus, tubes 11 and 12 respectively may be placed in a cut-off condition by means of suitable discharge circuits 32 and 33.

Figure 2:
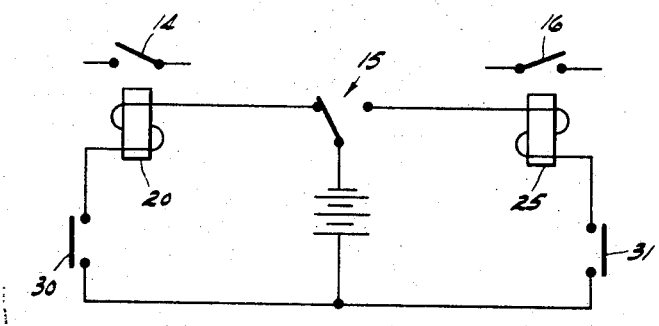
FIG. 2 is a control circuit for controlling the operation of the test circuit.

FIG. 2 shows a simple control circuit for controlling the operation of the testing circuit shown in FIG. 1. Initially, both tubes 11 and 12 are biased to cutoff so that no plate current flows in either. Closing control switch 30 operates relay 20 which, by actuation of switch 14, completes the circuit from the grid of tube 11 to a source of voltage less negative than the cutoff voltage. Current in the output of tube 11 builds up until the switch under test 15 operates, and transfers from the L to the R position, which, in turn, releases relay 20 and opens switch 14, preventing further current increase. Capacitor C maintains the grid voltage and plate current for further reference. Control switch 31 may now be closed to operate relay 25, thereby actuating switch 16 and closing the input circuit of tube 12. Current builds up in the output of tube 12, as described in connection with tube 11 until the switch under test is released and transfers from the R position to the L position. The two currents which are of interest may now be read from the meters 21 and 22.

Various departures may be made from the invention as described without departure from the spirit or scope of the invention.

What is claimed is:

A relay switch testing apparatus comprising a first vacuum tube and a second vacuum tube, the plate of the first vacuum tube being coupled over a first circuit path to the cathode of the second vacuum tube and the plate of the second vacuum tube being coupled over a second circuit path to the cathode of the first vacuum tube, a relay including a coil and a switch to be tested, the relay coil having one terminal connected to a point in the first path and the other terminal connected to a point in the second path, a first meter connected in the first path between the plate of the first vacuum tube and the point to which the one terminal of the relay coil is connected, a second meter connected in the second path between the plate of the second vacuum tube and the point to which the other terminal of the relay coil is connected, a biasing input cirucit for the first vacuum tube including a biasing source, a resistor, a capacitor coupled to the input grid of the first vacuum tube, and a first switch, closure of the first switch connecting the resistor and capacitor in series across the biasing source for initiating conduction in the first vacuum tube to provide a current of increasing magnitude for operation of the relay switch under test, a biasing input circuit for the second vacuum tube including a biasing source, a resistor, a capacitor coupled to the input grid of the second vacuum tube, and a second switch, and control means responsive to the actuation of the relay switch when the current through the relay coil reaches the operate value for opening said first switch and closing said second switch to connect the last mentioned resistor and capacitor in series across the last mentioned biasing source for initiating conduction in the second vacuum tube to provide a current which increases in magnitude until the relay is released, the control means being further responsive to the release of the relay switch when the current through the relay coil diminishes to the release value for opening said second switch.

References Cited by the Examiner
UNITED STATES PATENTS 2,229,806  1/1941  Holzler _____ 328—81
2,432,092  12/1947  Ferrell _____ 324—28

WALTER L. CARLSON, *Primary Examiner.*

SAMUEL BERNSTEIN, *Examiner.*

G. L. LETT, *Assistant Examiner.*